(12) United States Patent
Amargier et al.

(10) Patent No.: US 12,291,341 B2
(45) Date of Patent: May 6, 2025

(54) COMPACT ELECTRIC PROPULSION UNIT COMPRISING A STATICALLY DETERMINATE ENGINE MOUNT, AND AIRCRAFT COMPRISING AT LEAST ONE SUCH ELECTRIC PROPULSION UNIT

(71) Applicant: Airbus Operations SAS, Toulouse (FR)

(72) Inventors: Rémi Amargier, Toulouse (FR); Kotaro Fukasaku, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 131 days.

(21) Appl. No.: 18/177,352

(22) Filed: Mar. 2, 2023

(65) Prior Publication Data
US 2023/0286664 A1    Sep. 14, 2023

(30) Foreign Application Priority Data

Mar. 11, 2022    (FR) ...................................... 2202124

(51) Int. Cl.
*B64D 27/40*    (2024.01)
*B64D 27/30*    (2024.01)

(52) U.S. Cl.
CPC .............. *B64D 27/40* (2024.01); *B64D 27/30* (2024.01); *B64D 27/406* (2024.01)

(58) Field of Classification Search
CPC .... B64D 27/40; B64D 27/404; B64D 27/406; B64D 27/30; B64D 27/31; B64D 27/32
See application file for complete search history.

(56) References Cited

U.S. PATENT DOCUMENTS

| | | | |
|---|---|---|---|
| 2013/0125561 A1* | 5/2013 | Schwarz | F02K 3/06 60/802 |
| 2014/0369810 A1* | 12/2014 | Binks | B64D 27/40 244/54 |

(Continued)

FOREIGN PATENT DOCUMENTS

| | | |
|---|---|---|
| FR | 3097201 A1 | 12/2020 |
| GB | 2010969 A | 7/1979 |
| WO | 2021140294 A1 | 7/2021 |

OTHER PUBLICATIONS

French Search Report for French Patent Application No. 2202124 dated Sep. 27, 2022; priority document.

*Primary Examiner* — Michael C Zarroli
*Assistant Examiner* — Ka Chun Leung
(74) *Attorney, Agent, or Firm* — Greer, Burns & Crain, Ltd.

(57) ABSTRACT

An aircraft propulsion unit with an engine mount connecting a rigid casing, supporting a propeller, and a structure. First and second transverse link rods connect the casing and the structure with first and second joints each having an axis of pivoting substantially parallel to an axis of rotation of the propeller. First and second thrust rods connect the casing and the structure by first and second thrust rod connections. The first and second thrust rod connections separated from one another in the longitudinal direction. A longitudinal end stop is configured to limit the movement of the casing with respect to the structure in at least the longitudinal direction. An aircraft with at least one such propulsion unit.

15 Claims, 15 Drawing Sheets

(56) References Cited

U.S. PATENT DOCUMENTS

| | | | |
|---|---|---|---|
| 2015/0047370 A1* | 2/2015 | Beaujard | F02C 7/20 403/80 |
| 2018/0050811 A1* | 2/2018 | Niergarth | B64D 27/18 |
| 2018/0051702 A1* | 2/2018 | Kupiszewski | B64D 29/04 |
| 2023/0028982 A1 | 1/2023 | Glemarec et al. | |

* cited by examiner

COMPACT ELECTRIC PROPULSION UNIT COMPRISING A STATICALLY DETERMINATE ENGINE MOUNT, AND AIRCRAFT COMPRISING AT LEAST ONE SUCH ELECTRIC PROPULSION UNIT

CROSS-REFERENCES TO RELATED APPLICATIONS

This application claims the benefit of the French patent application No. 2202124 filed on Mar. 11, 2022, the entire disclosure of which is incorporated herein by way of reference.

FIELD OF THE INVENTION

The present application relates to a compact electric propulsion unit comprising a statically determinate engine mount and to an aircraft comprising at least one such electric propulsion unit.

BACKGROUND OF THE INVENTION

According to one embodiment visible in FIG. 1, an aircraft 10 comprises a fuselage 12, at least one wing structure 14 connected to the fuselage 12 and propulsion units 16 connected to the wing structure 14 and positioned on each side of the fuselage 12.

As illustrated in FIGS. 2 and 3, each propulsion unit 16 comprises an engine 18, a propeller 20 having an axis of rotation A20, a gearbox 22 connecting the engine 18 and the propeller 20, and a primary structure 24 connecting the engine 18 and the gearbox 22 to the wing structure 14.

For the remainder of the description, a longitudinal direction X is parallel to the axis of rotation A20 of the propeller 20. A longitudinal plane contains the axis of rotation A20. A transverse plane is perpendicular to the longitudinal direction X. A horizontal transverse direction Y is perpendicular to the longitudinal direction X and oriented horizontally. A vertical transverse direction Z is perpendicular to the longitudinal direction X and oriented vertically. The ideas of "front" and "rear" refer to the direction in which the air flows with respect to the aircraft in flight, the air flowing from front to rear.

In the case of a combustion engine or of a turbomachine engine, the engine 18 comprises a structural body capable of transmitting force, such as the thrusting forces generated by the propeller 20 for example.

According to a first embodiment visible in FIG. 2, the engine 18 is connected to the primary structure 24 by an engine mount which comprises a front engine mount 26 in the form of a front hoop connected, on the one hand, to the primary structure 24 and, on the other hand, to a forward region of the engine 18 by a plurality of interfaces which are positioned in a first transverse plane, and a rear engine mount 28 in the form of a rear hoop connected, on the one hand, to the primary structure 24 and, on the other hand, to a rear region of the engine 18 by a plurality of interfaces positioned in a second transverse plane.

The first and second transverse planes are spaced as far apart as possible in order to ensure optimum absorption of inertial loadings and/or moments induced by the propeller 20 and of the forces oriented in the horizontal and vertical transverse directions Y and Z.

This first embodiment, which is suitable for combustion engines or turbomachine engines, is not suitable for electric motors which are more compact and do not have mounting points that are spaced apart in the longitudinal direction X.

According to a second embodiment visible in FIG. 3, the engine mount comprises a front engine mount 30 connected, on the one hand, to the primary structure 24 and, on the other hand, to a front region of the engine 18, and a rear engine mount 28 in the form of a rear hoop connected, on the one hand, to the primary structure 24 and, on the other hand, to a rear region of the engine 18 by a plurality of interfaces positioned in a second transverse plane. The rear engine mount 28 may be substantially identical to that of the first embodiment. The front engine mount 30 comprises two link rods 32.1, 32.2 positioned one on each side of the vertical longitudinal plane, and a longitudinal link 34 positioned in the vertical longitudinal plane. Each link rod 32.1, 32.2 has a first end connected to the primary structure 24 by a first connection having at least one axis of pivoting, which may be parallel to the horizontal transverse direction Y, and a second end connected to the engine 18 by a first connection having at least one axis of pivoting parallel to the horizontal transverse direction Y. The longitudinal connection 34 comprises at least one axis of pivoting parallel to the longitudinal direction X and is not configured to be able to absorb thrusting forces oriented in the longitudinal direction X.

Like the first embodiment, the second embodiment, which is suitable for combustion engines or turbomachine engines, is not suitable for electric motors which are more compact and do not have mounting points that are spaced apart in the longitudinal direction X.

The present invention seeks to overcome all or some of the disadvantages of the prior art.

SUMMARY OF THE INVENTION

To this end, one subject of the invention is an aircraft propulsion unit comprising a structure secured to the aircraft, at least one electric motor, at least one propeller driven in rotation by the electric motor and configured to generate thrusting forces, a rigid casing configured to transmit the thrusting forces generated by the propeller and an engine mount connecting the casing and the structure, the propeller, which has an axis of rotation, defining a longitudinal direction parallel to the axis of rotation, a vertical longitudinal plane passing through the axis of rotation and which is vertical and a longitudinal and horizontal direction perpendicular to the vertical longitudinal plane.

According to the invention, the engine mount comprises:
first and second transverse link rods positioned on each side of the vertical longitudinal plane and each having a first end connected by at least a first joint to the structure and a second end connected by at least a second joint to the casing, each of the first and second joints having an axis of pivoting substantially parallel to the axis of rotation,
first and second thrust rods positioned on each side of the vertical longitudinal plane and having a first end connected by a first thrust rod connection to the structure and a second end connected by a second thrust rod connection to the casing, for each of the first and second thrust rods, the first and second thrust rod connections being separated from one another in the longitudinal direction,
a longitudinal end stop configured to limit a movement of the casing with respect to the structure in at least the longitudinal direction.

This engine mount makes it possible to obtain a statically determinate connection between the casing and the structure. Because the second joints connecting the transverse links and the casing and the second thrust rod connections connecting the thrust rods and the casing are positioned in the one same transverse plane or in transverse planes that are very closely spaced, this engine mount is suitable for casings that are compact in the longitudinal direction.

According to another feature, the longitudinal end stop comprises a finger secured to a first of the elements that are the casing and the structure, and a housing configured to at least partially house the finger provided at a second, different from the first, of the elements that are the casing and the structure, the finger having a first dimension measured in the longitudinal direction and a second dimension measured in the horizontal transverse direction.

According to a first embodiment, each first or second transverse link rod comprises a single first joint connecting it to the structure and a single second joint connecting it to the casing. In addition to that, the longitudinal end stop is configured to immobilize the casing with respect to the structure in the longitudinal direction and in a horizontal transverse direction.

According to another feature, the housing has a longitudinal dimension, measured in the longitudinal direction, substantially equal to the first dimension of the finger and a transverse dimension, measured in the horizontal transverse direction, substantially equal to the second dimension of the finger.

According to a second embodiment, the first transverse link rod comprises a single first joint connecting it to the structure and a single second joint connecting it to the casing, the second transverse link rod comprising a first joint connecting it to the structure, a second joint connecting it to the casing and a third joint connecting it to the structure or to the casing. In addition to this, the longitudinal end stop is configured to immobilize the casing with respect to the structure in the longitudinal direction and allow the casing a translational movement with respect to the structure in the horizontal transverse direction.

According to another feature, the housing has a longitudinal dimension, measured in the longitudinal direction, substantially equal to the first dimension of the finger and a transverse dimension, measured in the horizontal transverse direction, greater than the second dimension of the finger.

According to another feature, the engine mount comprises a system for limiting the spread of vibrations between the casing and the structure and comprising at least one elastic interface interposed between the finger and at least a vertical wall delimiting the housing.

This elastic interface is a sleeve positioned around the finger.

According to another feature, the engine mount comprises a whippletree to which the first ends of the first and second thrust rods are connected by the first thrust rod connections and a whippletree connection connecting the whippletree and the structure and comprising an axis of pivoting positioned in the vertical longitudinal plane that is approximately vertical or that makes an angle of less than 20° with respect to a vertical direction.

According to another feature, the engine mount comprises first and second whippletree end stops positioned approximately in the continuation of the first and second thrust rods and configured to limit the rotational movement of the whippletree about the axis of pivoting of the whippletree connection and/or to limit the spread of vibrations between the casing and the structure.

According to another feature, the whippletree comprises at least a substantially vertical rear face which extends on each side of the vertical longitudinal plane and the structure comprises, for each rear face, a front face substantially parallel to the rear face, each first or second whippletree end stop being interposed between a rear face and a front face.

According to another feature, each of the first and second whippletree end stops is separated from the corresponding rear face or front face by a travel, each of the first and second whippletree end stops being adjustable so as to adjust the travel and/or the compression of the first and second whippletree end stops.

According to another feature, the second thrust rod connections are positioned symmetrically with respect to the vertical longitudinal plane, the axes of pivoting of the second thrust rod connections being aligned.

Another subject of the invention is an aircraft comprising at least one propulsion unit according to one of the foregoing features.

BRIEF DESCRIPTION OF THE DRAWINGS

Further features and advantages will become apparent from the following description of the invention, which description is given purely by way of example, with reference to the attached drawings in which.

DETAILED DESCRIPTION OF THE PREFERRED EMBODIMENTS

Figure 1:
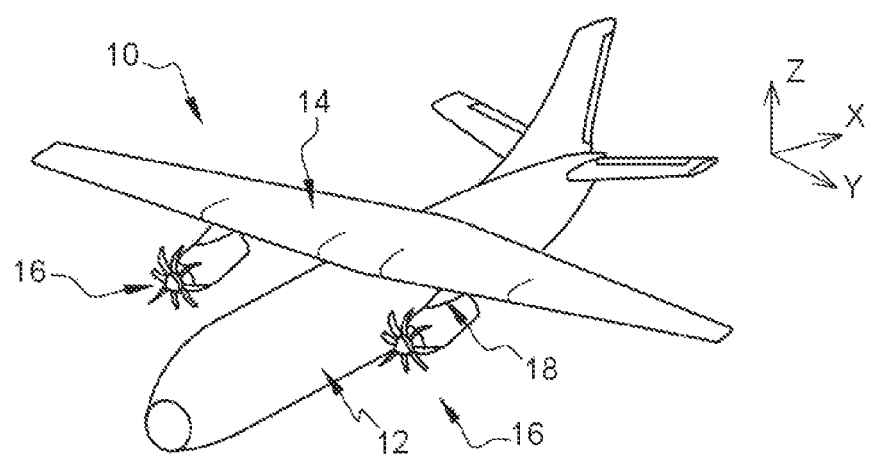
FIG. 1 is a schematic depiction, in perspective, of an aircraft illustrating one embodiment.
Figure 2:
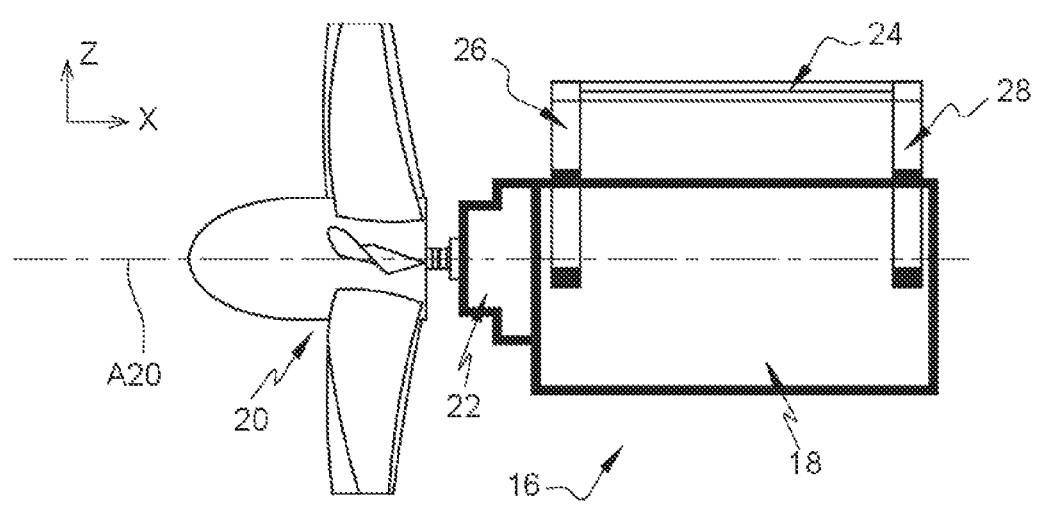
FIG. 2 is a schematic depiction, from the side, of a propulsion unit illustrating a first embodiment of the prior art.
Figure 3:
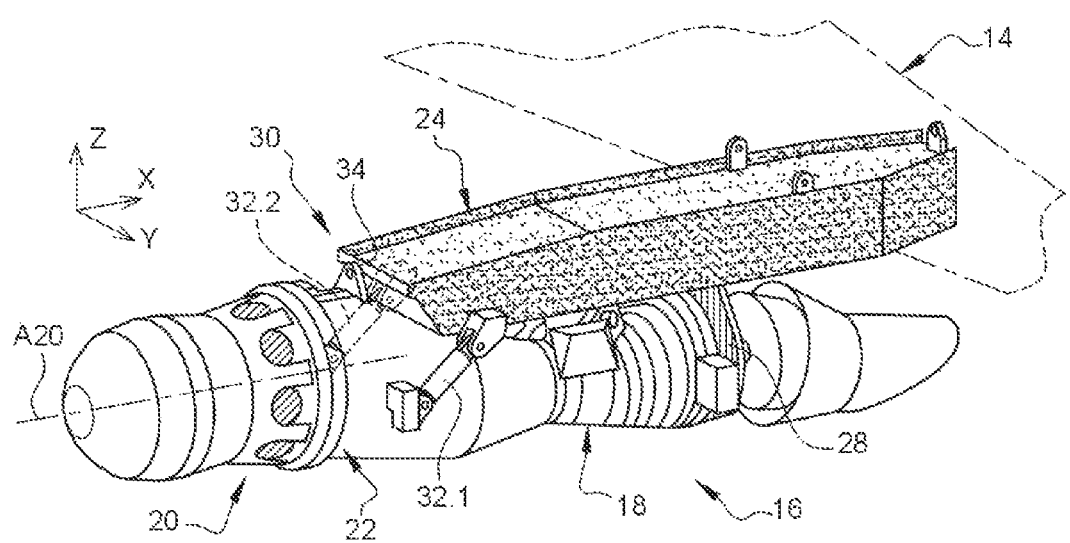
FIG. 3 is a perspective view of a propulsion unit illustrating a second embodiment of the prior art.

According to embodiments visible in FIGS. 4 to 15, an aircraft propulsion unit 40 comprises at least one motor 42, at least one propeller 44 having an axis of rotation A44 and a gearbox 46 connecting the motor 42 and the propeller 44.

The propulsion unit is of the electric type and comprises at least one electric motor 42.

According to one embodiment, each motor 42 has at least a field frame forming an outer enclosure. In one configuration, this field frame is not able to transmit force, such as the thrusting forces generated by the propeller 44 for example.

The gearbox 46 comprises a casing 48 forming an exterior enclosure. In one configuration, the casing 48 of the gearbox 46 is configured to transmit force, such as the thrusting forces generated by the propeller 44 for example.

The casing 48 comprises a rear face 48.1, positioned approximately in a transverse plane and on which at least one motor 42 is mounted and fixed, and a front face 48.2 through which there passes a transmission member, such as a shaft, that transmits a rotational movement between the motor 42 and the propeller 44.

Unlike the case with a combustion engine or a turbomachine engine, the rear and front faces 48.1, 48.2 of the casing 48 are closely spaced in the longitudinal direction X.

An aircraft comprises at least one such propulsion unit 40. This unit comprises at least a structure 50, also known as the primary structure 50, connecting the propulsion unit 40 and the wing structure (or the fuselage) of the aircraft and a secondary structure that forms an aerodynamic enclosure enclosing the primary structure 50.

According to one embodiment, the primary structure 50 has a box section structure that is elongate in the longitudinal direction X. However, the invention is not restricted to this embodiment of the primary structure 50 which could have a latticework structure or any other structure. In one configuration, in the case of a propulsion unit 40 that is suspended beneath a wing of an aircraft, the primary structure 50 is connected to the structure of the wing structure by an interface known as a wing hardpoint.

This primary structure 50 is configured to transmit force between the propulsion unit 40 and the structure of the wing structure or of the fuselage of the aircraft.

The propulsion unit 40 also comprises an interface, hereinafter referred to as an engine mount 52, connecting the casing 48 and the primary structure 50.

Of course, the invention is not restricted to these embodiments. Thus, the propulsion unit 40 could be connected directly to the structure of a wing structure or of a fuselage of an aircraft. Accordingly, whatever the embodiment, the propulsion unit 40 comprises an engine mount 52 which connects it to a structure 50 of an aircraft.

In addition, the rigid casing 48 is not necessarily that of the gearbox 46.

Whatever the embodiment, the propulsion unit 40 comprises at least one rigid casing 48 supporting the propeller 44 and configured to transmit force, such as the thrusting forces. This casing 48 may form part of the motor 42, of the gearbox 46 or of any other element of the propulsion unit 40 via which thrusting forces generated by the propulsion unit 40 pass.

The engine mount 52 comprises first and second thrust rods 54, 54' positioned on each side of the vertical longitudinal plane XZ, symmetrically. Each thrust rod 54, 54' has a first end 54.1 connecting the first or second thrust rod 54, 54' and the structure 50 via a first thrust rod connection 56.1, and a second end 54.2 connecting the first or second thrust rod 54, 54' and the casing 48 via a second thrust rod connection 56.2.

According to one embodiment, for each thrust rod 54, 54', the first and second thrust rod connections 56.1, 56.2 are spaced as far apart as possible in the longitudinal direction X.

According to one configuration, the second thrust rod connections 56.2 are positioned symmetrically with respect to the vertical longitudinal plane XZ and each comprise an axis of pivoting A56.2 substantially parallel to the horizontal transverse direction Y. In one arrangement, the axes of pivoting A56.2 of the second thrust rod connections 56.2 are aligned. They are generally secant with the axis of rotation A44 of the propeller 44.

According to one configuration, the second thrust rod connections 56.2 are ball-jointed.

Figure 4:
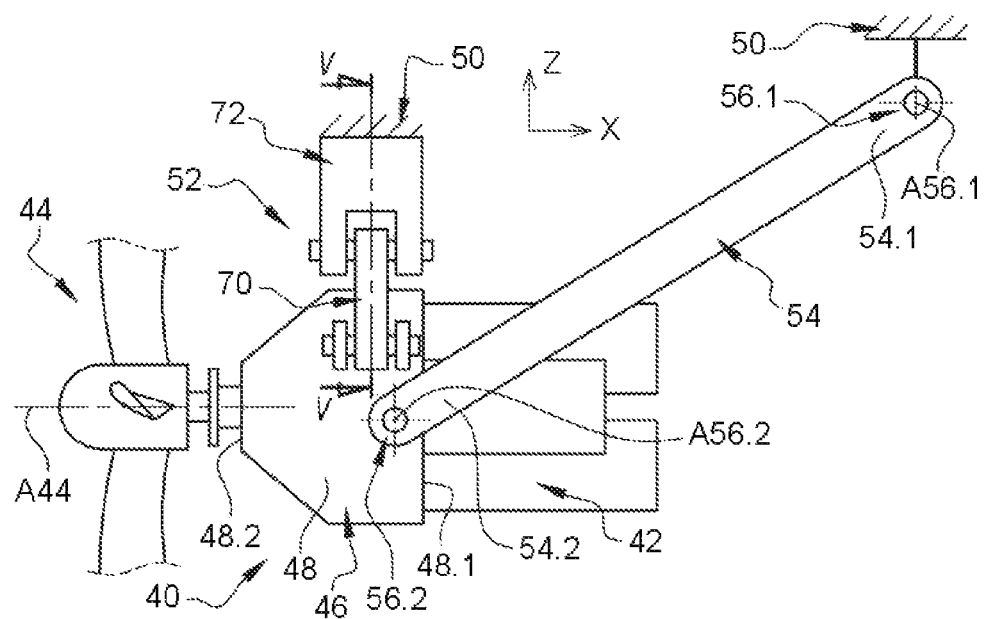
FIG. 4 is a side view of a propulsion unit illustrating a first embodiment of the invention.

According to a first embodiment visible in FIG. 4, the first thrust rod connections 56.1 are positioned symmetrically with respect to the vertical longitudinal plane XZ and each comprise an axis of pivoting A56.1 substantially parallel to the horizontal transverse direction Y. In one arrangement, the axes of pivoting A56.1 of the first thrust rod connections 56.1 are aligned. Like the case of the second thrust rod connections 56.2, the first thrust rod connections 56.1 may be ball-jointed. In a variant, the axes of pivoting A56.1 may be substantially vertical or make a small angle, less than 20°, with the vertical transverse direction Z.

Figure 10:
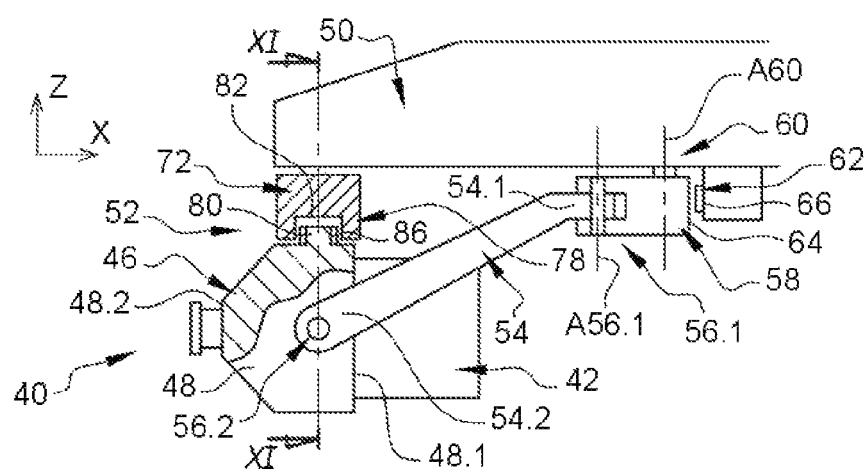
FIG. 10 is a side view of a propulsion unit illustrating a second embodiment of the invention.
Figure 13:
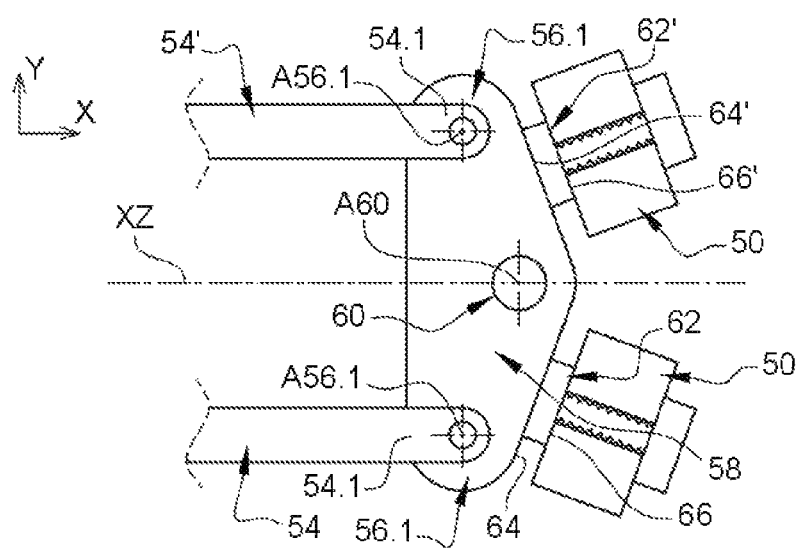
FIG. 13 is a plan view of a rear part of an engine mount illustrating one embodiment of the invention.

In a second embodiment visible in FIGS. 10 and 13, the engine mount 52 comprises a whippletree 58 interposed between the first ends 54.1 of the first and second thrust rods 54, 54' and the structure 50.

In this second embodiment, the first ends 54.1 of the first and second thrust rods 54, 54' are each connected to the whippletree 58 by a first thrust rod connection 56.1. As in the first embodiment, the first thrust rod connections 56.1 are positioned symmetrically with respect to the vertical longitudinal plane XZ and each comprise an axis of pivoting A56.1 which is vertical or forms a small angle, less than 20°, with the vertical transverse direction Z. In a variant, the axes of pivoting A56.1 could be parallel to the horizontal transverse direction Y and aligned.

The engine mount 52 also comprises a whippletree connection 60, connecting the whippletree 58 and the structure 50 and which has an axis of pivoting A60 positioned in the vertical longitudinal plane XZ that is approximately vertical or that makes a small angle, less than 20°, with the vertical transverse direction Z. The axis of pivoting A60 of the whippletree connection 60 is situated equidistant from the first thrust rod connections 56.1.

According to an arrangement visible in FIG. 13, the engine mount 52 comprises first and second whippletree end stops 62, 62' positioned approximately in the continuation of the first and second thrust rods 54, 54' and configured to limit the rotational movement of the whippletree 58 about the axis of pivoting A60 of the whippletree connection 60 and/or to limit the spread of vibrations between the casing 48 and the structure 50. The whippletree 58 has at least a substantially vertical rear face 64 which extends on each side of the vertical longitudinal plane XZ. In one arrangement, the whippletree 58 comprises two rear faces 64, 64', positioned on each side of the vertical longitudinal plane XZ, making between them an angle of the order of 150°. In addition to that, the structure 50 comprises, for each rear face 64, 64', a front face 66, 66' that is substantially parallel to the rear face 64, 64'. Each first or second whippletree end stop 62, 62' is interposed between a rear face 64, 64' and a front face 66, 66'. In one arrangement, each first or second whippletree end stop 62, 62' is connected to the front face 66, 66' of the structure 50.

The first and second whippletree end stops 62, 62' are spaced as far apart as possible in the horizontal transverse direction Y and are positioned, if possible, at least partially in line with the first and second thrust rods 54, 54'.

According to one embodiment, each of the first and second whippletree end stops 62, 62' is a slightly elastically deformable compression end stop.

Each of the first and second whippletree end stops 62, 62' is separated from the corresponding rear face 64, 64' or front face 66, 66' by a travel that can be zero.

According to one configuration, each of the first and second whippletree end stops 62, 62' is adjustable so as to adjust the travel of the whippletree 58 or adjust the compression of the first and second whippletree end stops 62, 62'.

The engine mount 52 also comprises first and second transverse links 68, 70, positioned in a transverse plane, on each side of the vertical longitudinal plane XZ connecting the casing 48 and the structure 50. According to one configuration which has not been depicted, the first and second transverse link rods 68, 70 are directly connected to the structure 50.

According to another configuration visible in FIGS. 4 to 6, 10 and 11, the engine mount 52 comprises a transverse beam 72, secured to the structure 50, and to which the first and second transverse links 68, 70 are connected.

According to one embodiment, at least the first transverse link 68 comprises a first end 68.1 connected to the structure 50, directly or indirectly via the transverse beam 72, by a first joint 74.1 and a second end 68.2 connected to the casing 48 by a second joint 74.2.

The first and second joints 74.1, 74.2 each comprise an axis of pivoting A74.1, A74.2 substantially parallel to the longitudinal direction X. Thus, the axes of pivoting A74.1, A74.2 of the first and second joints 74.1, 74.2 are substantially parallel to one another.

According to one embodiment which has not been depicted, the first and second transverse links 68, 70 are each connected to the structure 50, directly or indirectly via the transverse beam 72, by a first joint 74.1 and a second end 68.2 connected to the casing 48 by a second joint 74.2.

According to another embodiment, the second transverse link 70 comprises a first end 70.1 connected to the structure 50, directly or indirectly via the transverse beam 72, by a first joint 76.1, a second end 70.2 connected to the casing 48 by a second joint 76.2 and an intermediate region 70.3 connected to the structure 50, directly or indirectly via the transverse beam 72 or to the casing 48 by a third joint 76.3; the first, second and third joints 76.1, 76.2, 76.3 not being aligned.

Figure 5:
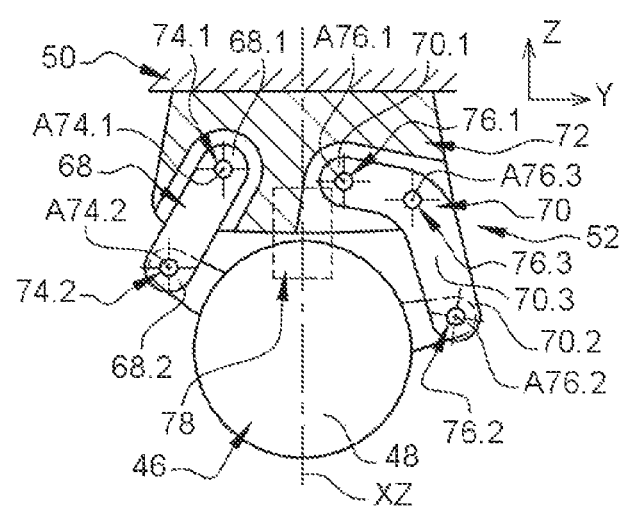
FIG. 5 is a cross section on the plane V-V of FIG. 4, of part of an engine mount illustrating one embodiment of the invention.

According to one configuration visible in FIG. 5, the third joint 76.3 connects the second transverse link 70 and the transverse beam 72.

Figure 11:
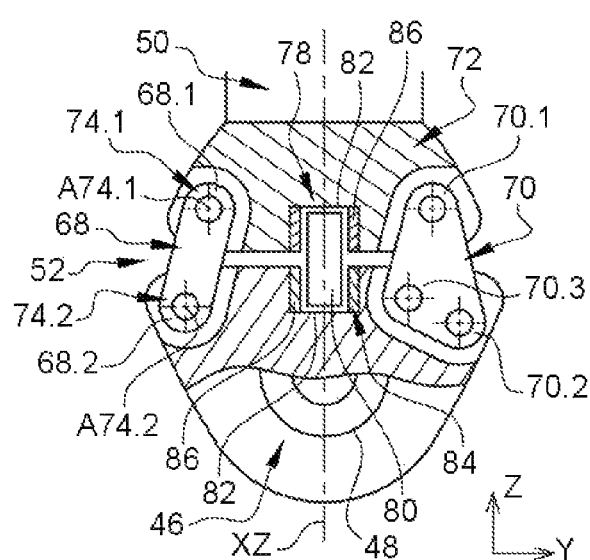
FIG. 11 is a cross section on the plane XI-XI of FIG. 10 of part of an engine mount illustrating one embodiment of the invention.

According to another configuration visible in FIG. 11, the third joint 76.3 connects the second transverse link 70 and the casing 48.

Each of the first, second and third joints 76.1, 76.2, 76.3 has an axis of pivoting A76.1, A76.2, A76.3 substantially parallel to the longitudinal direction X. Thus, the axes of pivoting A76.1, A76.2, A76.3 of the first, second and third joints 76.1, 76.2, 76.3 are parallel to one another.

Whatever the embodiment, each of the first and second transverse links 68, 70 has a first end 68.1, 70.1 connected by at least a first joint 74.1, 76.1 to the structure 50, directly or indirectly via a transverse beam 72, and a second end 68.2, 70.2 connected by at least a second joint 74.2, 76.2 to the casing 48.

In one arrangement, of the first, second and third joints 74.1, 74.2, 76.1, 76.2, 76.3 of the first and second transverse links 68, 70, at least one may be ball-jointed.

According to one embodiment, for each first joint 74.1, 76.1 of the first and second transverse links 68, 70, the transverse beam 72 comprises a two-arm yoke between the two arms of which the first or second transverse link 68, 70 is positioned. In addition to this, for each second joint 74.2, 76.2 of the first and second transverse links 68, 70, the casing 48 comprises a two-arm yoke between the two arms of which the first or second transverse link 68, 70 is positioned. The engine mount 52 also comprises at least one longitudinal end stop 78 interposed between the casing 48 and the structure 50 (or the transverse beam 72) and configured to limit a travel in at least the longitudinal direction X of the casing 48 with respect to the structure 50.

This longitudinal end stop 78 comprises a finger 80 secured to a first of the elements that are the casing 48 and the structure 50 (either directly or indirectly via the transverse beam 72) and a housing 82 that is configured to at least partially house the finger 80 provided on the second, different from the first, of the elements that are the casing 48 and the structure 50 (either directly or indirectly via the transverse beam 72).

Figure 6:
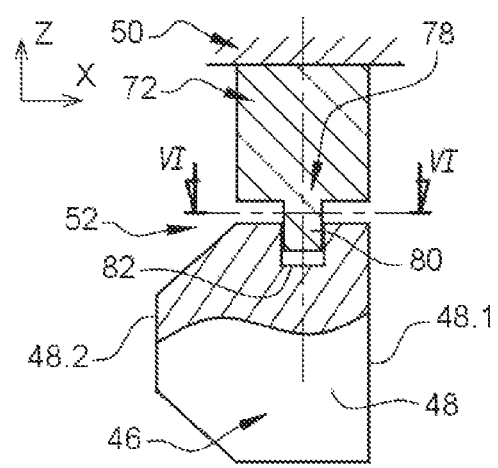
FIG. 6 is a longitudinal section through part of an engine mount incorporating a longitudinal end stop illustrating one embodiment of the invention.

According to one configuration visible in FIG. 6, the finger 80 is secured to the transverse beam 72 and the housing 82 is provided on the casing 48.

According to another configuration visible in FIG. 10, the finger 80 is secured to the casing 48 and the housing 82 is provided on the transverse beam 72.

According to one embodiment, the finger 80 has a first dimension measured in the longitudinal direction X and a second dimension measured in the horizontal transverse direction Y. According to a first variant visible in FIG. 7, the finger 80 has a circular cross section. According to a second variant visible in FIG. 8, the finger 80 has a square or rectangular cross section.

Figure 7:
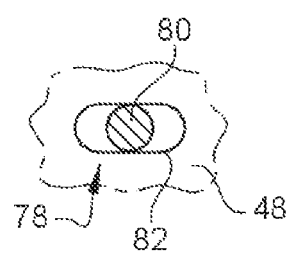
FIG. 7 is a horizontal section on the plane VI-VI of FIG. 6 of a longitudinal end stop illustrating a first configuration of the invention.
Figure 8:
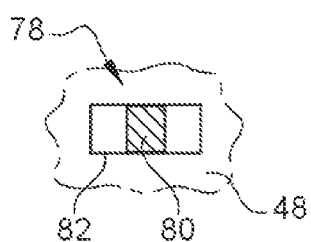
FIG. 8 is a horizontal section on the plane VI-VI of FIG. 6 of a longitudinal end stop illustrating a second configuration of the invention.
Figure 9:
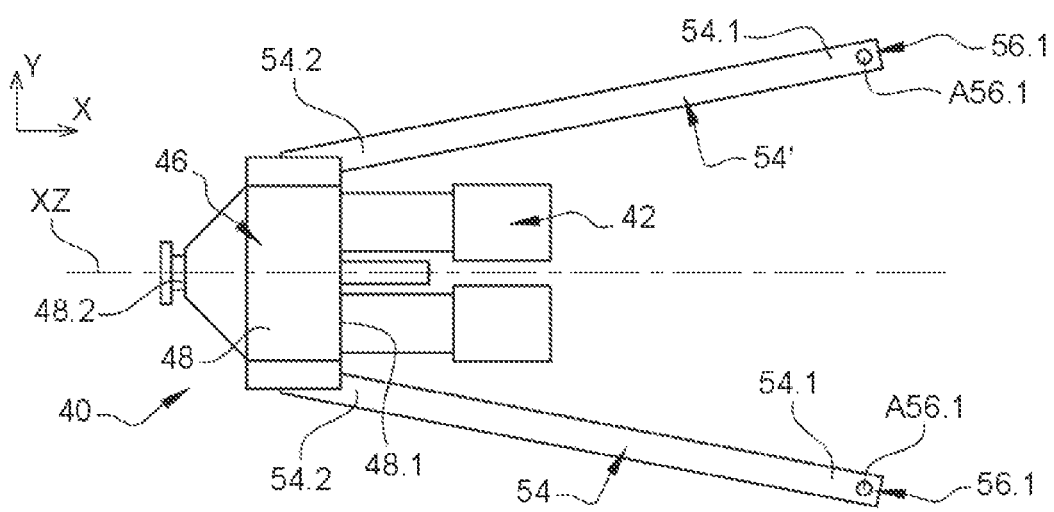
FIG. 9 is a plan view of the propulsion unit visible in FIG. 4.

According to a first configuration, the first transverse link 68 comprises two joints 74.1, 74.2 and the second transverse link 70 comprises three joints 76.1, 76.2, 76.3. In this first configuration, the longitudinal end stop 78 is configured to immobilize the casing 48 with respect to the structure 50 in the longitudinal direction X and to allow the casing 48 a translational movement with respect to the structure 50 in the horizontal transverse direction Y. As illustrated in FIGS. 7 and 8, the housing 82 has a longitudinal dimension, measured in the longitudinal direction X, that is substantially equal to the first dimension of the finger 80 and a transverse dimension, measured in the horizontal transverse direction Y, that is very much greater than the second dimension of the finger 80.

In this first configuration, the transverse links 68, 70 allow the casing 48 to be immobilized with respect to the structure 50 in terms of translational movement along the horizontal transverse axis Y and along the vertical transverse axis Z, and in rotation about the longitudinal axis X. The longitudinal end stop 78 allows the casing 48 to be immobilized with respect to the structure 50 in terms of translational movement along the longitudinal axis X. The longitudinal end stop 78 and the thrust rods 54, 54' allow the casing 48 to be immobilized with respect to the structure 50 in terms of rotation about the horizontal transverse axis Y. Finally, the thrust rods 54, 54' allow the casing 48 to be immobilized with respect to the structure 50 in terms of rotation about the vertical transverse axis Z.

In a second configuration, the first and second transverse links 68, 70 each comprise only two joints 74.1, 74.2, 76.1, 76.2. In this second configuration, the longitudinal end stop 78 is configured to immobilize the casing 48 with respect to the structure 50 in the longitudinal direction X and in the horizontal transverse direction Y. For this purpose, the housing 82 has a longitudinal dimension, measured in the longitudinal direction X, substantially equal to the first dimension of the finger 80 and a transverse dimension, measured in the horizontal transverse direction Y, substantially equal to the second dimension of the finger 80.

In this second configuration, the transverse links 68, 70 make it possible to immobilize the casing 48 with respect to the structure 50 in terms of translational movement along the vertical transverse axis Z and in terms of rotation about the longitudinal axis X. The longitudinal end stop 78 allows the casing 48 to be immobilized with respect to the structure 50 in terms of translational movement along the longitudinal axis X and the horizontal transverse axis Y. The longitudinal end stop 78 and the thrust rods 54, 54' make it possible to immobilize the casing 48 with respect to the structure 50 in terms of rotation about the horizontal transverse axis Y. Finally, the thrust rods 54, 54' make it possible to immobilize the casing 48 with respect to the structure 50 in terms of rotation about the vertical transverse axis Z.

Whatever the embodiment, the engine mount 52 makes it possible to obtain a statically determinate connection. This engine mount 52 comprises joints 56.2, 74.2, 76.2 at the casing 48 which are positioned in the one same transverse plane or in transverse planes that are very close to one another which means that this engine mount 52 can be used for casings 48 that are compact in the longitudinal direction X. The fact that the joints 74.1, 76.1 connecting the transverse links 74, 76 and the structure 50 are spaced as far away as possible from the joints 56.1 connecting the thrust rods 54, 54' and the structure 50 contributes to ensuring optimal transmission of force (more particularly thrusting forces).

Figure 14:
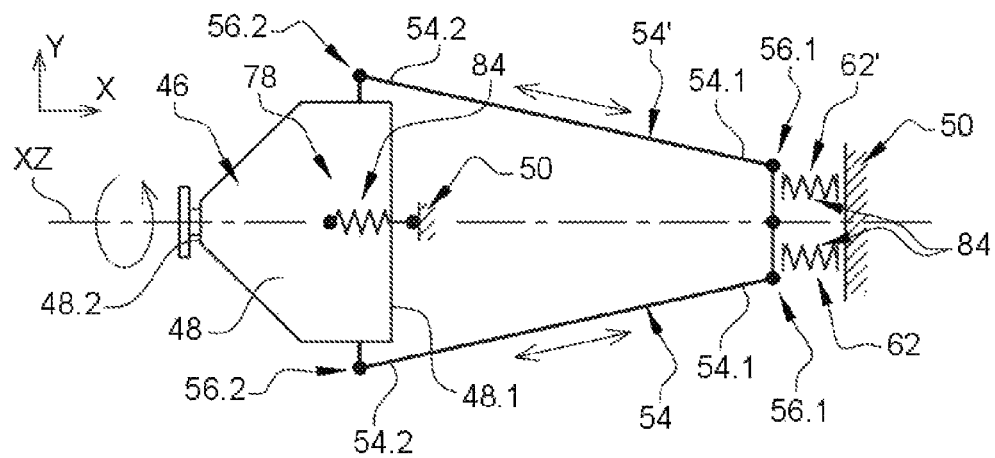
FIG. 14 is a schematic depiction, from above, of an engine mount illustrating one embodiment of the invention.
Figure 15:
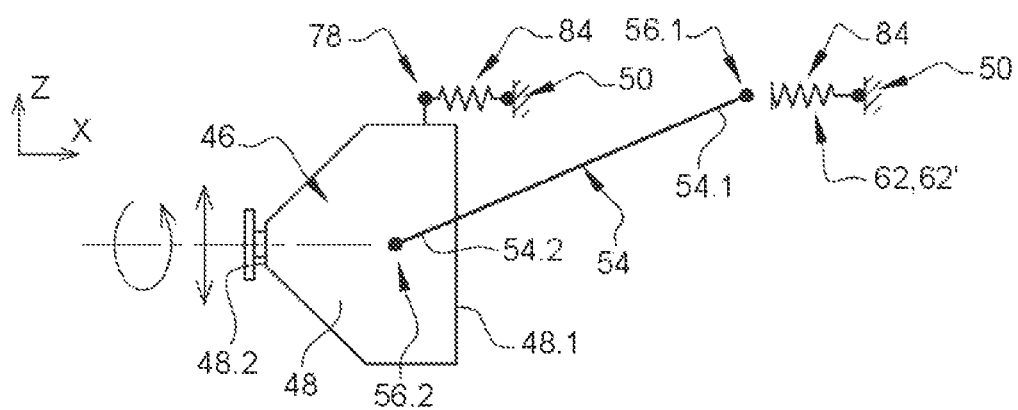
FIG. 15 is a schematic depiction, from the side, of the engine mount visible in FIG. 14.

According to an embodiment depicted schematically in FIGS. 14 and 15, the engine mount 52 comprises a system 84 for limiting the spread of vibrations between the casing 48 and the structure 50.

This system for limiting the spread of vibrations comprises the first and second whippletree end stops 62, 62'. It also comprises at least one elastic interface 86 interposed between the finger 80 and at least a vertical wall delimiting the housing 82 of the longitudinal end stop 78.

Figure 12:
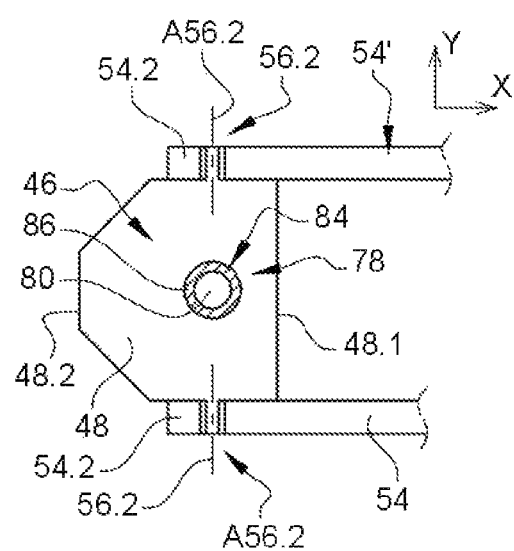
FIG. 12 is a plan view of a longitudinal end stop of an engine mount illustrating one embodiment of the invention.

According to an embodiment visible in FIGS. 11 and 12, the elastic interface 86 is a sleeve positioned around the finger 80 and interposed between the finger 80 and the vertical wall delimiting the housing 82.

The elastic interface 86 is able to deform elastically in compression and has a Shore hardness suited to transmitting force while damping vibrations.

According to a configuration visible in FIG. 11, the finger 80 is distinct from the transverse beam 72 and from the casing 48 and has a first end configured to lodge in a first housing provided at the transverse beam 72 and a second end configured to lodge in a second housing provided at the casing 48. The first and second ends of the finger 80 each comprise an elastic interface 86 in the form of a sleeve surrounding the finger 80. In this configuration, the housings accommodating the first and second ends of the finger 80 have dimensions configured to immobilize the finger 80 in the longitudinal direction X and in the transverse and horizontal direction Y with respect to the structure 50 and to the casing 48. In this configuration, the first and second transverse links 68, 70 each comprise just two joints 74.1, 74.2.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion unit for an aircraft, the propulsion unit comprising:
   a structure secured to the aircraft,
   an electric motor,
   a propeller driven in rotation by the electric motor and configured to generate thrusting forces which sustain flight,
   a rigid casing configured to transmit the thrusting forces generated by the propeller, and
   an engine mount connecting the rigid casing and the structure,
   the propeller, which has an axis of rotation, defining a longitudinal direction parallel to the axis of rotation, a vertical longitudinal plane passing through the axis of rotation and which is vertical and a longitudinal and horizontal direction perpendicular to the vertical longitudinal plane,
   wherein the engine mount comprises:
      first and second transverse link rods positioned on each side of the vertical longitudinal plane and each having a first end connected by, at least, a first joint to the structure and a second end connected by, at least, a second joint to the rigid casing, each of the first and second joints having an axis of pivoting parallel to the axis of rotation,
      first and second thrust rods positioned on each side of the vertical longitudinal plane and having a first end connected by a first thrust rod connection to the structure and a second end connected by a second thrust rod connection to the rigid casing, for each of the first and second thrust rods, the first and second thrust rod connections being separated from one another in the longitudinal direction, and,
      a longitudinal end stop configured to limit a movement of the rigid casing with respect to the structure in at least the longitudinal direction.

2. The propulsion unit according to claim 1, wherein the longitudinal end stop comprises a finger, secured to one of the rigid casing or the structure, and a housing configured to at least partially house the finger, the housing provided at the other of the rigid casing or the structure, the finger having a first dimension measured in the longitudinal direction and a second dimension measured in a horizontal transverse direction.

3. The propulsion unit according to claim 2, wherein the housing has a longitudinal dimension, measured in the longitudinal direction, equal to the first dimension of the finger and a transverse dimension, measured in the horizontal transverse direction, equal to the second dimension of the finger.

4. The propulsion unit according to claim 2, wherein the housing has a longitudinal dimension, measured in the longitudinal direction, equal to the first dimension of the finger and a transverse dimension, measured in the horizontal transverse direction, greater than the second dimension of the finger.

5. The propulsion unit according to claim 2, wherein the engine mount comprises a system for limiting a spread of vibrations between the rigid casing and the structure and comprising at least one elastic interface interposed between the finger and at least a vertical wall delimiting the housing.

6. The propulsion unit according to claim 5, wherein the at least one elastic interface is a sleeve positioned around the finger.

7. The propulsion unit according to claim 1, wherein the engine mount comprises a whippletree to which the first ends of the first and second thrust rods are connected by the first thrust rod connections and a whippletree connection connecting the whippletree and the structure and comprising an axis of pivoting positioned in the vertical longitudinal plane that is approximately vertical or that makes an angle of less than 20° with respect to a vertical direction.

8. The propulsion unit according to claim 7, wherein the engine mount comprises first and second whippletree end stops positioned in a continuation of the first and second thrust rods and configured to limit a rotational movement of the whippletree about the axis of pivoting of the whippletree connection, or to limit a spread of vibrations between the rigid casing and the structure, or both.

9. The propulsion unit according to claim 8, wherein the whippletree comprises at least a vertical rear face which extends on each side of the vertical longitudinal plane, and
wherein the structure comprises, for each rear face, a front face parallel to the rear face, each first or second whippletree end stop being interposed between a rear face and a front face.

10. The propulsion unit according to claim 9, wherein each of the first and second whippletree end stops is separated from the corresponding rear face or front face by a travel and in that each of the first and second whippletree end stops is adjustable so as to adjust the travel.

11. The propulsion unit according to claim 9, wherein that each of the first and second whippletree end stops is a elastically deformable compression end stop, and
wherein each of the first and second whippletree end stops is adjustable so as to adjust the compression of the first and second whippletree end stops.

12. The propulsion unit according to claim 1, wherein each first and second transverse link rod comprises a single first joint connecting the first or second transverse link rod to the structure and a single second joint connecting the first or second transverse link rod to the rigid casing, and
wherein the longitudinal end stop is configured to immobilize the rigid casing with respect to the structure in the longitudinal direction and in a horizontal transverse direction.

13. The propulsion unit according to claim 1, wherein the first transverse link rod comprises a single first joint connecting the first transverse link rod to the structure and a single second joint connecting the first transverse link rod to the rigid casing,
wherein the second transverse link rod comprises a first joint connecting the second transverse link rod to the structure, a second joint connecting the second transverse link rod to the rigid casing and a third joint connecting the second transverse link rod to the structure or to the rigid casing, and
wherein the longitudinal end stop is configured to immobilize the rigid casing with respect to the structure in the longitudinal direction and allow the rigid casing a translational movement with respect to the structure in a horizontal transverse direction.

14. The propulsion unit according to claim 1, wherein the second thrust rod connections are positioned symmetrically with respect to the vertical longitudinal plane, and
wherein axes of pivoting of the second thrust rod connections are aligned.

15. An aircraft comprising at least one of the propulsion unit according to claim 1.

* * * * *